US006447908B2

(12) United States Patent
Yun et al.

(10) Patent No.: US 6,447,908 B2
(45) **Date of Patent: *Sep. 10, 2002**

(54) METHOD FOR MANUFACTURING PHOSPHOR-COATED PARTICLES AND METHOD FOR FORMING CATHODOLUMINESCENT SCREEN USING THE SAME FOR FIELD EMISSION DISPLAY

(75) Inventors: Sun Jin Yun; Joong Whan Lee, both of Daejeon (KR)

(73) Assignee: Electronics and Telecommunications Research Institute, Daejeon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,537

(22) Filed: Dec. 22, 1997

(30) Foreign Application Priority Data

Dec. 21, 1996 (KR) ........................................ 96-69795

(51) Int. Cl.[7] .......................... B32B 5/16; H01J 29/20

(52) U.S. Cl. .......................... 428/403; 252/301.4 R; 313/479; 313/483

(58) Field of Search .................. 428/403; 252/301.4 R; 313/479, 483

(56) References Cited

U.S. PATENT DOCUMENTS 3,875,449 A 4/1975 Byler et al.
4,508,760 A 4/1985 Olson et al.
4,515,827 A 5/1985 Dodds et al.
4,585,673 A 4/1986 Sigai
4,713,577 A * 12/1987 Gualtieri et al. ............ 313/468
4,835,437 A * 5/1989 Berkstresser et al. ....... 313/468
4,894,583 A * 1/1990 Berkstresser et al. ....... 313/468
4,904,901 A * 2/1990 Simopoulos et al. ....... 313/509
4,961,956 A * 10/1990 Simopoulos et al. ....... 427/215
4,990,371 A 2/1991 Dutta et al.
5,093,696 A * 3/1992 Kinoshita .................... 357/17
5,166,092 A * 11/1992 Mochizuki et al. ......... 437/105
5,206,877 A * 4/1993 Kahen ......................... 372/96
5,270,247 A * 12/1993 Sakuma et al. ............. 437/133
5,314,759 A * 5/1994 Harkonen et al. .......... 428/690
5,418,062 A * 5/1995 Budd ......................... 428/403
5,466,358 A 11/1995 Kiyomiya et al.
5,582,703 A 12/1996 Sluzky et al.
5,602,445 A * 2/1997 Solanki et al. .............. 313/503
5,667,655 A 9/1997 Libman et al.
5,742,322 A * 4/1998 Cranton et al. ............. 347/238
5,756,147 A * 5/1998 Wu et al. ...................... 427/66
5,834,053 A * 11/1998 Dye et al. ...................... 427/66
5,879,459 A * 3/1999 Gadgil et al. ............... 118/715
5,939,825 A * 8/1999 Sun et al. .................... 313/503
5,982,082 A * 11/1999 Janning ...................... 313/336
6,015,326 A * 1/2000 Potter .......................... 445/52

* cited by examiner

*Primary Examiner*—Hoa T. Le
(74) *Attorney, Agent, or Firm*—Jacobson Holman, PLLC

(57) ABSTRACT

A method for forming a cathodoluminescent screen by forming cathodoluminescent films on the inner surface of screen panel for a field emission display by a screen printing, a spray, or an electrodeposition process. The field emission display cathodoluminescent particles for improving a luminescent emission efficiency, wherein the improved cathodoluminescent particles are formed by coating a uniform phosphor material on the surfaces of cathodoluminescent particles by an atomic layer deposition.

14 Claims, 5 Drawing Sheets

METHOD FOR MANUFACTURING PHOSPHOR-COATED PARTICLES AND METHOD FOR FORMING CATHODOLUMINESCENT SCREEN USING THE SAME FOR FIELD EMISSION DISPLAY

BACKGROUND OF THE INVENTION

1. Field of the Invention

The present invention relates to a method for implementing a microencapsulation of phosphor particles or transparent conducting particles using a phosphor material to improve a luminous efficiency of a cathodoluminescent and a method for forming a cathodoluminescent screen using the same for a field emission display, and more particularly to a method for forming a cathodoluminescent screen provided with uniform cathodoluminescent phosphor-coated particles for a field emission display by a method such as an electrodeposition, a screen printing, or a spray by using the phosphor-coated particles.

2. Description of the Related Art

Phosphor particles are used in a variety of applications such as a flat panel display and decoration, cathode ray tube, and fluorescent lighting fixture. Luminescence or light emission from phosphor-coated particles may be stimulated by applying of heat, light, high energy radiation, or electric fields.

It has been recognized that various improvements in the performance of phosphors can be obtained if the phosphor material is coated with a protective film or pigment. Numerous attempts have been made to coat the outer surfaces of individual particles with a protective coating material.

U.S. Pat. No. 4,508,760 discloses an encapsulation technique of phosphor particles by a vacuum deposition using a certain polymer.

U.S. Pat. No. 4,515,827 is achieved by disclosing phosphor particles coated by the color modifying material while the particles are rotated in a vacuum chamber.

U.S. Pat. No. 4,585,673 discloses the formation of a continuous protective coating on phosphor particles by gas-phase chemical vapor deposition while the phosphor particles are suspended within a fluidized bed.

U.S. Pat. No. 4,515,827 discloses encapsulated cathodoluminescent phosphor particles by a vapor phase hydrolysis reaction of oxide precursor material.

U.S. Pat. No. 5,156,885 discloses encapsulated phosphor particles by a low temperature vapor phase hydrolysis reactions and deposition process.

In the above coating techniques, the movement, rotation, or vibration of the particles was necessary for a uniform film growth because it was very hard to deposit uniform, conformal continuous, and stoichiometric thin film or particles.

Also, the cathodoluminescent films of the cathodoluminescent screen of a cathode-ray tube, such as a color cathode-ray tube or a monochromatic cathode-ray tube, are formed principally by a slurry process, and the cathodoluminescent films of the cathodoluminescent screen of some cathode-ray tubes are formed by a screens printing, a spray, or an electrodeposition process.

Generally, ZnO, $ZnGa_2O_4$: Mn, $ZnGa_2O_4$: Eu, YAG: Tb, $Y_2SiO_5$: Ce, $Y_2O_3$: Eu, $Y_2O_2$ S: Tb, $Gd_2$ $O_2$ S: Tb, SrS: Ce, SrTe: Ce, SrS-$Sc_2S_3$, ZnS: Ag, ZnS: Pr, $SrGa_2$ $S_4$, ZnCdS: Cu, Al are used for cathodoluminescent materials of the cathodoluminescent screen of a field emission display.

However, in the conventional cathodoluminescent particles to form a screen of a cathode ray tube, the surfaces of the particles are continuously polished and are exposed to a dilution liquid, so that the surface of the same may be changed, thus forming a dead layer and decreasing the characteristic of the cathodoluminescence of very surface region of the particles.

Therefore, in the industry, the technique for reducing the dead layer formed on the surface of the cathodoluminescent particle becomes an important technique.

The conventional phosphor particles used in the thick film type will be explained with reference to FIGS. 1A and 1B.

FIGS. 1A and 1B are cross-sectional views showing conventional phosphor particles and a cathodoluminescent screen using the same for a field emission display, respectively.

As shown in FIG. 1B, a transparent conductive layer 2 is formed on the transparent substrate 1. A cathodoluminescent films 3*a* composed of phosphor particles 3 of the FIG. 1 on the transparent conduction layer 2 is formed using phosphor-coated particles 3 of fine powder types having a diameter of less than 10 micron in average particle size by a screen printing, a spray, or an electrodeposition process.

FIG. 2 is a cross-sectional schematic drawing of a field emission display showing an electron emission tip, or field emission cathode, surrounded by the self-aligned gate structures.

Referring to FIG. 2, the electron emission tip 4 is integral with the single crystal semiconductor substrate 5, and serves as a cathode conductor. Gate 8 serves as a low potential anode or grid structure for its respective cathode 4. A dielectric insulating layer 7 is deposited on the conductive cathode layer 6. The insulator 7 also has an opening at the field emission site location.

A field emission display employing a cold cathode is depicted. The substrate 5 can be comprised of glass, for example, or any of a variety of other suitable materials, In the preferred embodiment, a single crystal silicon layer serves as a substrate 5 onto which a conductive material layer 6, such as doped polycrystalline silicon has been deposited. At a field emission site location, a conical micro-cathode 4 has been constructed on the top of the substrate 5. Surrounding the micro-cathode 4, is a low potential anode gate structure 8. When a voltage is applied between the cathode 4 and the gate 8, a stream of electrons 9 is emitted toward a phosphor-coated screen 1. Screen 1 is an anode and includes cathodoluminescent material 3 on its surface. The display faceplate cover with the included cathodoluminescent layer is distantly disposed with respect to the electron emission structure. Same of emitted electrons of will impinge upon the cathodoluminescent material, and at least some of the energy of the emitted electrons is converted to photon energy as visible light. The visible light is transmitted through the transparent conduction layer 2 and the transparent substrate 1 of the display to the viewer.

The purity and intensity of light is determined by composition, uniformity and surface state of the phosphor particles. Luminous efficiency of the cathodoluminescent films formed by the thick film type is particularly determined by uniformity of the particle size and surface state of the particle. Also, the photoemission from the thin surface layer of phosphor particles becomes more important in the field emission display operated by lower acceleration voltage of electron beam.

When phosphor particles of the FIG. 1 are formed by a conventional technique, a dead layer (non-luminescent on the particle surface is formed by continuously polishing or by exposing in the dilution with destructive state. Therefore, such conventional invention of the thick film type has been reduced luminous efficiency.

Also, if acceleration voltage of the electron beam is low, a photoemission region is thinly formed, the thinnest surface of the cathodoluminescent layer is emitted. Therefore, the surface state of the phosphor particles have influence on the luminous efficiency.

Disadvantages associated with these known methods are eliminated by the method of the present invention by which a thin phosphor film having a desired substantially uniform thickness is formed by an atomic layer deposition on the outer surface of the phosphor particles or the transparent conducting particles.

SUMMARY OF THE INVENTION

Accordingly, an object of the present invention is to provide a method for coating phosphor layer on the phosphor particles and the transparent conducting particles by an atomic layer deposition to improve the luminous efficiency of the cathodoluminescent films for a field emission display and which does this while avoiding the disadvantages of the prior art.

It is another object of the present invention to provide a method for forming a cathodoluminescent screen by forming cathodoluminescent films on the inner surface of screen panel for a field emission display by a method such as a screen printing, a spray and an electrodeposition process.

To achieve the above objects, there is provided field emission display cathodoluminescent particles for improving a luminescent emission efficiency according to a first embodiment of the present invention, wherein the improved cathodoluminescent particles are formed by coating a uniform cathodoluminescent material on the surfaces of cathodoluminescent particles by an atomic layer deposition.

To achieve the above objects, there is provided a field emission display cathodoluminescent layer forming method including a transparent substrate and a transparent electrode layer formed on the transparent substrate according to a second embodiment of the present invention, wherein the improved method is directed to forming cathodoluminescent particles, on which a uniform cathodoluminescent material is coated by an atomic layer deposition, on the surface of a field emission display unit by an electrophoretic deposition method.

To achieve the above objects, there is provided a field emission display cathodoluminescent layer forming method including a transparent substrate and a transparent electrode layer formed on the transparent substrate according to a third embodiment of the present invention, wherein the improved method is directed to forming cathodoluminescent particles, on which a uniform phosphor material is coated by an atomic layer deposition, on the surface of a field emission display unit by a screen printing method.

To achieve the above objects, there is provided a field emission display cathodoluminescent layer forming method including a transparent substrate and a transparent electrode layer formed on the transparent substrate according to a fourth embodiment of the present invention, wherein the improved method is directed to forming cathodoluminescent particles, on which a uniform phosphor material is coated by an atomic layer deposition, on the surface of field emission display screen unit by a spray method.

To achieve the above objects, there is provided field emission display cathodoluminescent particles for improving a cathodoluminescent efficiently according to a fifth embodiment of the present invention, wherein the improved field emission display cathodoluminescent particles are formed by coating a uniform cathodoluminescent material on the surfaces of transparent conducting particles by an atomic layer deposition.

To achieve the above objects, there is provided a field emission display cathodoluminescent layer forming method including a transparent substrate and a transparent electrode layer formed on the transparent substrate according to a sixth embodiment of the present invention, wherein the improved method is directed to forming cathodoluminescent particles, which are formed by coating uniform cathodoluminescent material on the surface of transparent conducting particles by an atomic layer deposition, on a screen of the field emission display unit by an electrophoretic deposition method.

To achieve the above objects, there is provided a field emission display cathodoluminescent layer forming method including a transparent substrate and a transparent electrode layer formed on the transparent substrate according to a seventh embodiment of the present invention, wherein the improved method is directed to forming cathodoluminescent particles, which are formed by coating an uniform cathodoluminescent material on the surface of transparent conducting particles by an atomic layer deposition, on the screen of a field emission display unit by a screen printing method.

To achieve the above objects, there is provided a field emission display cathodoluminescent layer forming method including a transparent substrate and a transparent electrode layer formed on the transparent substrate according to an eighth embodiment of the present invention, wherein the improved method is directed to forming cathodoluminescent particles, which are formed by coating uniform cathodoluminescent material on the surface of transparent conducting particles by an atomic layer deposition, on the sereen of a field emission display unit by a spray method.

Atomic layer deposition is a chemical thin film deposition method based on saturation surface reactions. The unique feature of atomic layer deposition is that reactant vapors—elements or compounds—are pulsed onto the substrate alternately, one at a time. Between the reactant pulses the reactor is either purged with an inert gas or evacuated. With a proper adjustment of the experiment conditions, i.e. substrate temperature, reactant doses and lengths of pulse a chemisorbed monolayer of the first reactant is retained on the substrate after the purge sequence. This chemisorbed monolayer reacts subsequently with the other precursor dosed onto the substrate resulting in a solid film and, if compounds are exploited as precursors, gaseous byproducts. By repeating this deposition cycle the film is grown layer-by-layer. However, due to steric hindrances of bulky precursor molecules and surface reconstructions, the surface density of chemisorbed species remains often too low for a formation of a complete crystal layer of the film during one cycle. Nevertheless, the film thickness is still only a function of the number of deposition cycles repeated. As a result, the growth is said to be self-controlled or self-limited.

Also, in accordance with a preferred embodiment of the present invention, there is provided a method of forming a cathodoluminescent screen for a field emission display by depositing particles of a cathodoluminescent material or cathodoluminescent materials on the inner surface of a screen panel by an elctrodeposition process.

A method of forming a cathodoluminescent film by an electrodeposition process in accordance with the present invention forms on the inner surface of a screen panel for a field emission display comprising: immersing the screen panel in an electrodeposition solution in which particles of a cathodoluminescent material is dispersed, applying a negative voltage on the transparent conduction layer and a positive voltage a counter electrode immersed opposite to each other in an electrodeposition solution prepared by dispersing particles of a cathodoluminescent material in an electrolyte for positively or negatively charging the particles of the cathodoluminescent material, a negative voltage and a positive voltage are applied respectively to the transparent electrode of the screen panel and the counter electrode when the cathodoluminescent material is positively charged to deposit the cathodoluminescent material over the surface of the electrode, washing and drying the screen panel after the cathodoluminescent film has been formed.

Also, a method of forming a cathodoluminescent film of the cathodoluminescent screen by a screen printing or a spray deposition process in accordance with the present invention for a field emission display comprises: mixing a paste or a solvent and a phosphor-coated particles, forming on the inner surface of a screen panel by the screen printing or the spray method.

BRIEF DESCRIPTION OF THE DRAWINGS

The above and other objects, features and advantages of the present invention will become apparent from the following description of embodiments with reference to the accompanying drawings, in which.

DETAILED DESCRIPTION OF THE PREFERRED EMBODIMENTS

Embodiments of the present invention will be explained with reference to the drawings.

Figure 5:
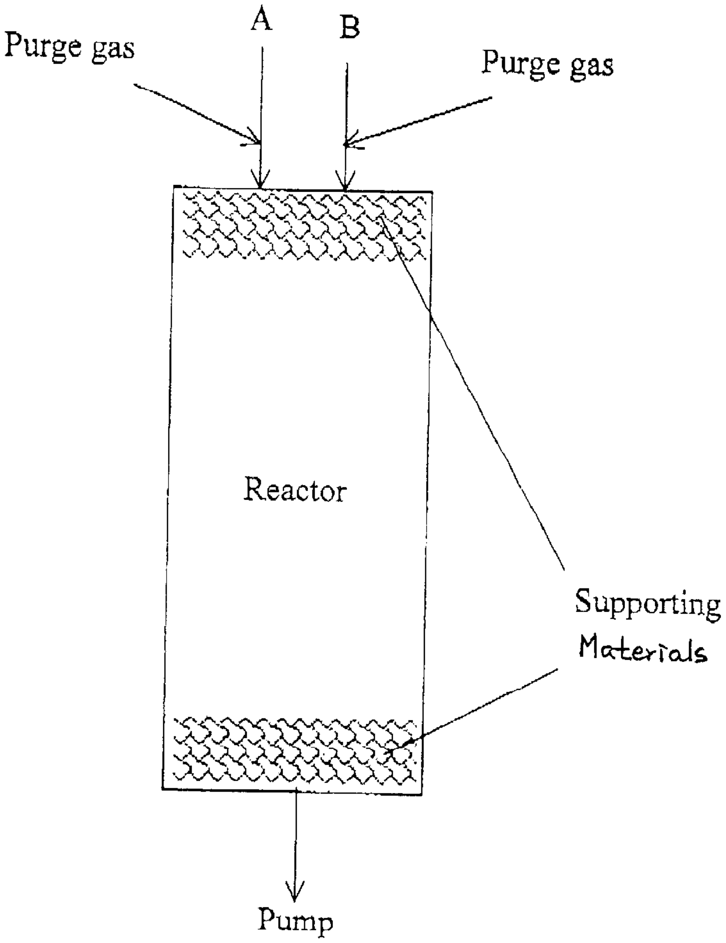
FIG. 5 is a schematic diagram of atomic layer deposition process used in the present invention.

Atomic layer deposition is a chemical thin film deposition technique based on saturated surface reactions. The unique feature of atomic layer deposition is that reactant gas or reactant vapors carried with inert gas—elements or compounds—are pulsed onto the substrate alternately, one at a time. Between the reactant pulses the reactor is purged with an inert gas and evacuated. The schematic diagram of atomic layer deposition process of reactants A and B is shown in FIG. 5. The pulsing sequence is source A —purge gas —source B —purge gas. With a proper adjustment of the experimental conditions, i.e., reactor temperature, reactant doses and lengths of pulses and purge sequence, and an exactly chemisorbed monolayer of the first reactant A is retained on the surface after the purge sequence. This chemisorbed monolayer reacts subsequently with the other precursor B dosed onto the surface resulting in a solid film and, if compounds are exploited as precursors, gaseous byproducts. By repeating this deposition cycle the film is grown layer-by-layer.

For the embodiment of the present invention, as shown in FIG. 5, the reactor with filled with the phosphor particles or transparent conducting particles and supported by a supporting materials. The supporting material in the leading part of the reactor can distribute the gas flow evenly. The supporting material in the trailing part of the reactor supports the particles. The supporting materials should not disturb the flow of reactant gases and purge gases.

Figure 1A:
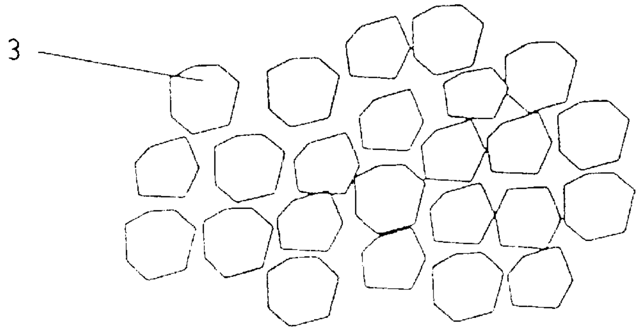
FIG. 1A [PRIOR ART]
FIGS. 1A and 1B are cross-sectional view showing conventional phosphor particles and a cathodoluminescent screen using the same for a field emission display, respectively.
Figure 1B:
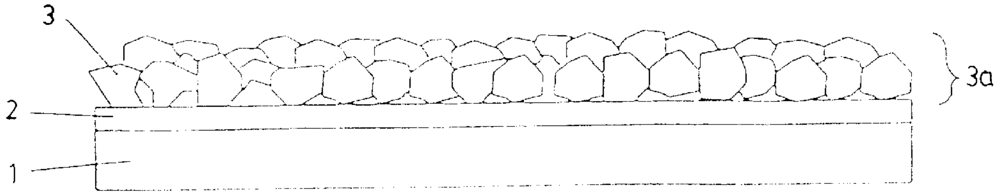
FIG. 1B [PRIOR ART]
Figure 2:
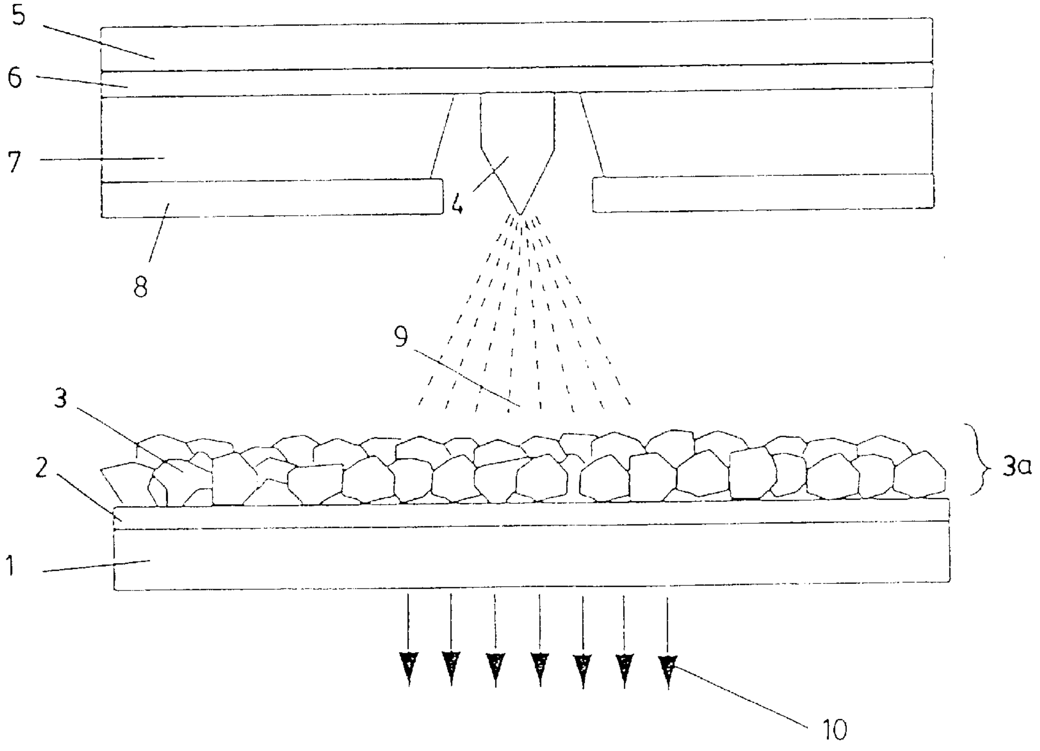
FIG.2 [PRIOR ART]
FIG. 2 is a cross-sectional schematic drawing of a field emission display.
Figure 3A:
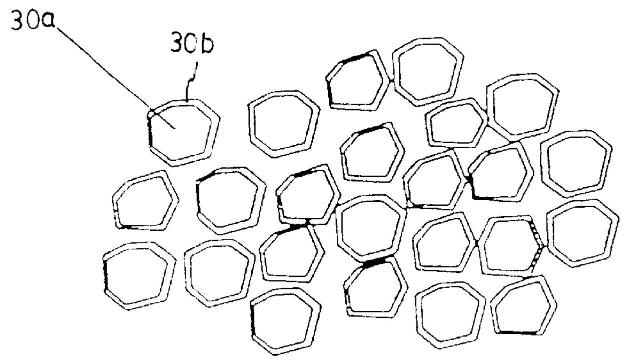
FIGS. 3A and 3B are cross-sectional view showing phosphor-coated particles and transparent conducting particles by an atomic layer deposition and a cathodoluminescent screen using the same for a field emission display respectively, in a preferred embodiment according to the present invention.

Referring to FIGS. 3A, the cathodoluminescent (or phosphor-coated) particles 30 are formed by coating a uniform cathodoluminescent material 30*b* on the surface of phosphor particles 30*a* by using the above-mentioned atomic layer deposition.

In the present invention, the atomic layer deposition for forming the cathodoluminescent films 30*b* on the particles 30*a* is carried out using at least one of halide precursors of Al, Ga, Sr, Ca, Si, transition metal elements and rare earth elements including Zn, Y, Gd, Te, Sc, Cd, and Ta. Also, the atomic layer deposition for forming the cathodoluminescent films 30*b* on the particles 30*a* is carried out using at least one of organometallic precursors of Al, Ga, Sr, Ca, Si, transition metal elements and rare earth elements including Zn, Y, Gd, Te, Sc, Cd, and Ta.

Preferably, the materials of the cathodoluminescent or phosphor particles 30*a* are ZnO, $ZnGa_2O_4$, $Y_2SiO_5$ $Y_2O_3$, $Y_2O_3S$, $Y_3Al_5O_{12}$, $Gd_2O_2S$, $Ga_2O_3$, SrS, SrTe, SrS-$Sc_2S_3$, ZnS, $SrGa_2S_4$, ZnCdS, $Ta_2Zn_3O_8$, and mixtures thereof. The material is doped with transition metal or rare earth elements as the luminescent center.

Also, the cathodoluminescent coating materials 30*b* are ZnO, $ZnGa_2O_4$, $Y_2SiO_5$, $Y_2O_3$, $Y_2O_3$ S, $Y_3Al_5O_{12}$ , $G_2d_2O$ S, $G_2a_3O$, SrS, SrTe, SrS-$Sc_2S_3$, ZnS, $SrGa_2S_4$ , ZnCdS, $T_2a$ $Z_3n$ $O_8$, and mixtures thereof or multilayers thereof, doped with transition metal or rare earth elements as the luminescent center. More preferably, the cathodoluminescent coating materials 30*b* can used same as the materials of cathodoluminescent particles 30*a*. The diameter of chathodoluminescent particles 30*a* is ranging from 0.5 $\mu$m to 20 $\mu$m and the thickness of cathodoluminescent coating film 30*b* is in the range of 1–100 nm.

Meanwhile, the cathodoluminescent particles can be formed by coating a uniform cathodoluminescent material on the surface of transparent conducting particles (not shown) by atomic layer deposition. At this time, the material of the transparent conducting particles is used In-doped $SnO_2$, Al-doped ZnO, Sb-doped $SnO_2$, conducting polymer, or mixtures thereof. Also, the diameter of the transparent conducting particle is ranging from 0.5 $\mu$m to 20 $\mu$m.

Figure 3B:
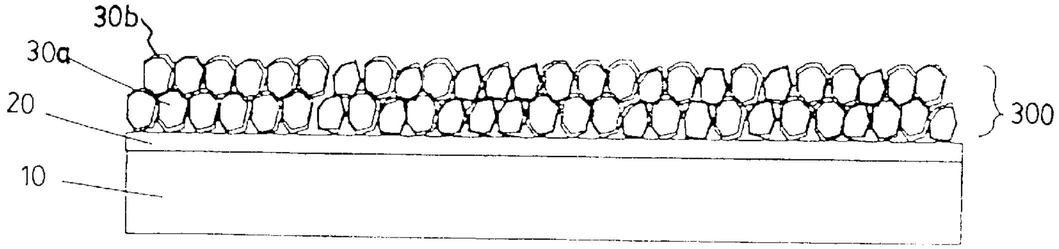
Figure 4A:
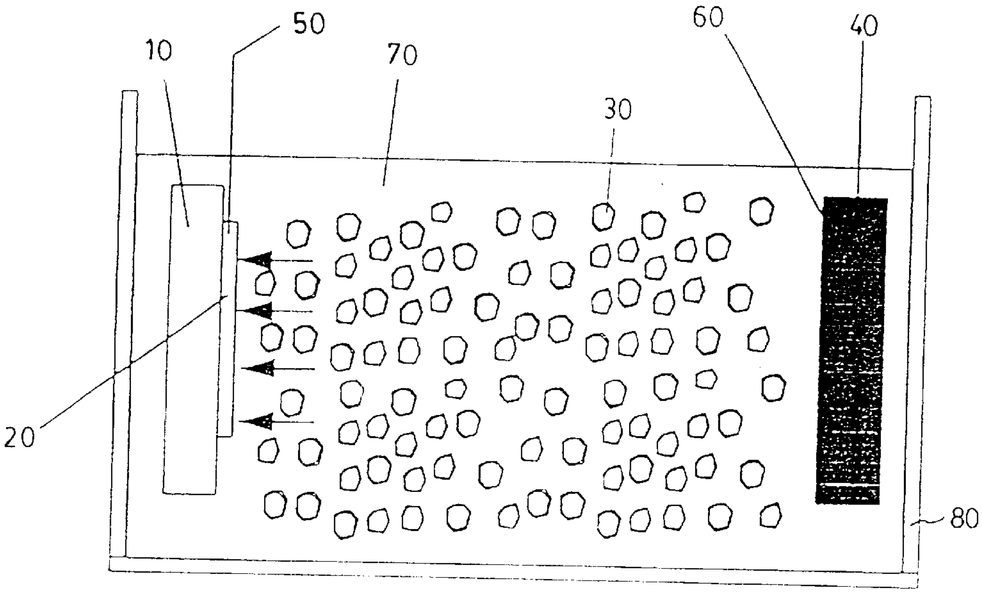
FIG. 4A is a cross-sectional view showing a method of forming a cathodoluminescent screen for a field emission display by an electrodeposition process in accordance with an embodiment of the present invention.

Next, as shown in FIG. 3B, the cathodoluminescent layer 30*a* composed by the phosphor-coated particles 30 is formed on the transparent conduction layer 20 of the transparent substrate 10 FIG. 4A is a cross sectional view showing a method of forming a cathodoluminescent screen for a field emission display by electrodeposition process in accordance with an embodiment of the present invention.

First, as shown in FIG. 4A, a transparent conduction layer 20 is formed on the transparent surface 10 for a field emission display. The negative electrode and the positive electrode 40 through the terminal 50 and 60 are connected to the transparent conduction layer 20 and the positive electrode 40 of carbon or the like, respectively. The negative and positive electrode is immersed in chamber 80 confused with an electrodeposition solution 70 and a phosphor-coated particles 30. A negative voltage and a positive voltage are applied respectively to the transparent conduction layer 20 of the transparent substrate and the counter electrode 40 of carbon or the like in an electrolyte 70 for positively or negatively charging the phosphor particles 30 of the cathodoluminescent material. The cathodoluminescent material is positively charged to deposit the cathodoluminescent material over the surface of the electrode. A positive particles are deposited on the transparent conduction layer 20 of the transparent substrate 10.

Figure 4B:
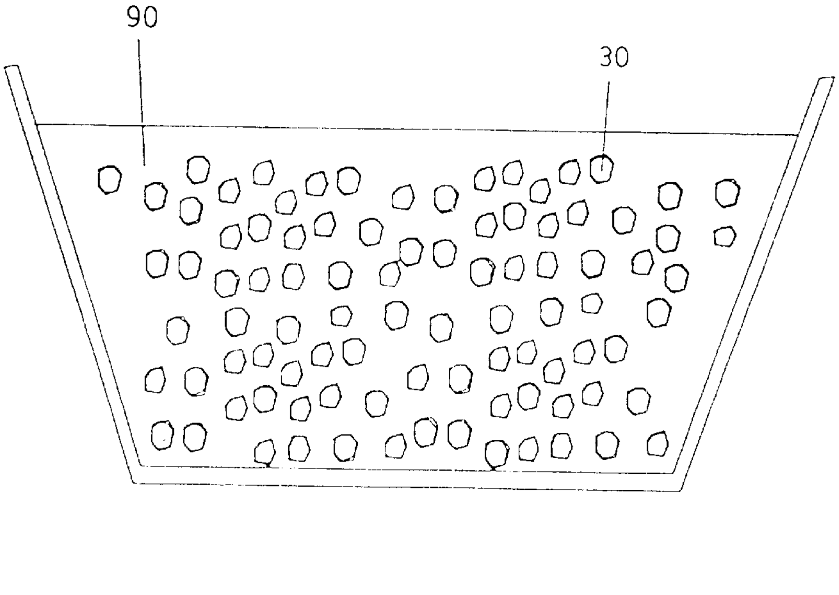
FIG. 4B is a cross-sectional view showing a method of forming the slurry of cathodoluminescent phosphor particles for a screen for a field emission display by a screen printing or a spray process in accordance with an embodiment of the present invention.

Also, as shown in FIG. 4B, phosphor-coated particles 30 is confused in a paste or a solvent 90, and cathodoluminescent film is formed by the screen printing or the spray method on the transparent conduction layer.

As has been described above, the present invention can be used to widen a coating range of the particle which can be realized by an atomic layer deposition method capable of precise control of the film thickness uniformity and of composition of the phosphor particle, each having a large effect on photoemission characteristics in units of atom layers, in an atomic layer deposition technique for realizing a fine cathodoluminescent screen structure expected to perform a high luminous efficiency. Also, this enables growth of various types of compound semiconductors, therefore, makes it possible to grow a hereto structure, essential in realization of a device. As a result, it is expected that the atom layer atomic layer deposition method is put into particle use, and the range of its applications is widened.

As is apparent from the forgoing description, the method of forming a cathodoluminescent screen by using phosphor-coated particles for a field emission display by electrodeposition, screen printing, or spray process in accordance with the present invention has a uniform thickness. Also, a cathodoluminescent screen forming method for forming a color cathodoluminescent screen can be selectively formed with green, blue and red cathodoluminescent materials by repeating an electrodeposition process.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. In field emission display cathodoluminescent particles for improving a cathodoluminescent efficiency, wherein the improved cathodoluminescent particles comprising cathodoluminescent particles on which a uniform cathodoluminescent material is coated on the surfaces of said cathodoluminescent particles using an atomic layer deposition.

2. The particles according to claim 1, wherein the material of cathodoluminescent particles is at least one compound selected from the group consisting of ZnO, $ZnGa_2O_4$, $Y_2SiO_5$, $Y_2O_3$, $Y_2O_3S$, $Y_3Al_5O_{12}$, $Gd_2O_2S$, $Ga_2O_3$, SrS, SrTe, SrS-$Sc_2S_3$, ZnS, $SrGa_2S_4$, ZnCdS, $Ta_2Zn_3O_8$, and mixtures thereof, doped with transition metal or rare earth elements as the luminescent center.

3. The particles according to claim 1, wherein the cathodoluminescent coating material is at least one compound selected from the group consisting of ZnO, $ZnGa_2O_4$, $Y_2SiO_5$, $Y_2O_3$, $Y_2O_3S$, $Y_3Al_5O_{12}$, $Gd_2$ $O_2$ S, $Ga_2O_3$, SrS, SrTe, SrS-$Sc_2S_3$, ZnS, $SrGa_2S_4$, ZnCdS, $Ta_2Zn_3O_8$, and mixtures thereof, doped with transition metal or rare earth elements as the luminescent center.

4. The particles according to claim 1, wherein the diameter of cathodoluminescent particles is ranging from 0.5 $\mu$m to 20 $\mu$m.

5. The particles according to claim 1, wherein the thickness of cathodoluminescent film on the particles is in the range of 1–100 nm.

6. The particles according to claim 1, wherein the atomic layer deposition is carried out using at least one of halide precursors of Al, Ga, Sr, Ca, Si, transition metal elements and rare earth elements including Zn, Y, Gd, Te, Sc, Cd, and Ta.

7. The particles according to claim 1, wherein the atomic layer deposition is carried out using at least one of organometallic precursors of Al, Ga, Sr, Ca, Si, transition metal elements and rare earth elements including Zn, Y, Gd, Te, Sc, Cd, and Ta. deposition.

8. In field emission display cathodoluminescent particles for improving a cathodoluminesecent efficiency, wherein the improved cathodoluminescent particles comprising transparent conducting particles on which a uniform cathodoluminescent material is coated on the surfaces of said transparent conducting particles using an atomic layer deposition.

9. The particles according to claim 8, wherein the material of the transparent conducting particles is at least one compound selected from the group consisting of In-doped $SnO_2$, Al-doped ZnO, Sb-doped $Sn_2O$, conducting polymer, and mixtures thereof.

10. The particles according to claim 8, wherein the diameter of the transparent conducting particle is ranging from 0.5 $\mu$m to 20 $\mu$m.

11. The particles according to claim 8, wherein the cathodoluminescent coating material is at least one compound selected from the group consisting of ZnO, $ZnGa_2O_4$, $Y_2SiO_5$ , $Y_2O_3$, $Y_2O_3S$, $Y_3Al_5O_{12}$, $Gd_2$ $O_2$ S, $Ga_2$ $O_3$, SrS, SrTe, SrS-$Sc_2S_3$, ZnS, $SrGa_2S_4$, ZnCdS, $Ta_2$ $Zn_3$ $O_8$, and mixtures thereof, doped with transition metal or rare earth elements as the luminescent center.

12. The particles according to claim 8, wherein the thickness of cathodoluminescent film on the particles is in the range of 1–100 nm.

13. The particles according to claim 8, wherein the atomic layer deposition is carried out using at least one of halide precursors of Al, Ga, Sr, Ca, Si, transition metal elements and rare earth elements including Zn, Y, Gd, Te, Sc, Cd, and Ta.

14. The particles according to claim 8, wherein the atomic layer deposition is carried out using at least one of organometallic precursors of Al, Ga, Sr, Ca, Si, transition metal elements and rare earth elements including Zn, Y, Gd, Te, Sc, Cd, and Ta.

* * * * *